April 30, 1946.　　　　O. D. KELLY　　　　2,399,190
POST DRIVING ATTACHMENT FOR POST HOLE DIGGERS
Filed Dec. 29, 1944　　　2 Sheets-Sheet 1

INVENTOR.
OWEN D. KELLY
BY
Merrill M. Blackburn

April 30, 1946.   O. D. KELLY   2,399,190
POST DRIVING ATTACHMENT FOR POST HOLE DIGGERS
Filed Dec. 29, 1944   2 Sheets-Sheet 2
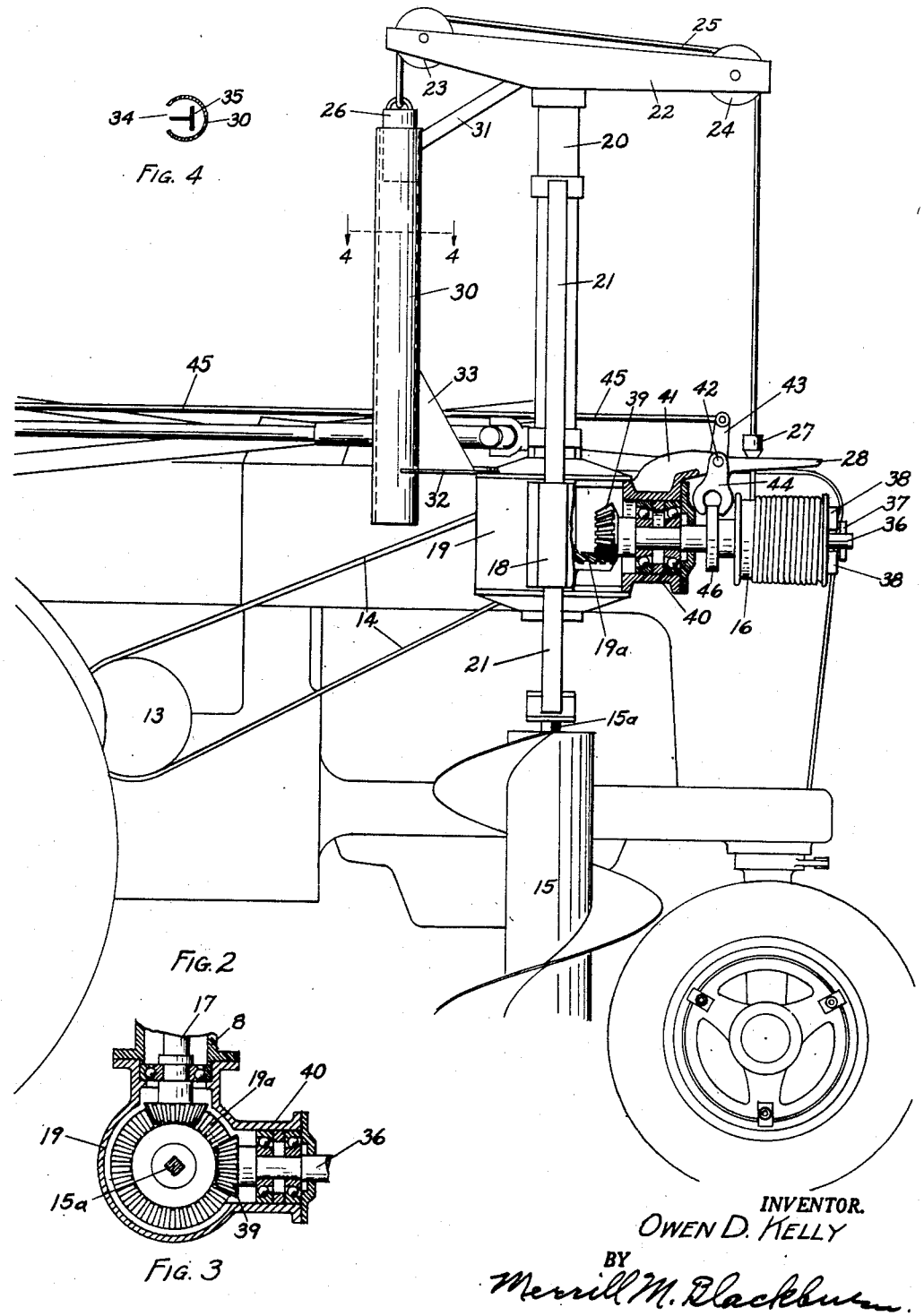
INVENTOR.
OWEN D. KELLY
BY
Merrill M. Blackburn Patented Apr. 30, 1946

2,399,190

UNITED STATES PATENT OFFICE 2,399,190

POST DRIVING ATTACHMENT FOR POST HOLE DIGGERS

Owen D. Kelly, Joy, Ill.

Application December 29, 1944, Serial No. 570,433

7 Claims. (Cl. 61—74)

My present invention relates to a mechanism for driving posts and more especially metal posts, the same being particularly adapted for use in connection with a post hole digger. Among the objects of this invention are to provide a complete mechanism so that one who has one of these machines will be equipped to set the posts rapidly for a fence, whether these be wooden or metallic; to provide a mechanical structure for the driving of metal posts, quickly and with a minimum of effort; to provide an automatically functioning apparatus for the purpose indicated which will raise the driving weight to the upper limit of its motion and then automatically drop the weight whenever it reaches its said upper limit; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 2 shows a right side elevation of the structure shown in Fig. 1;

Fig. 3 shows a horizontal plan section through the gear housing of the mechanism for operating the winding drum and turning the auger; and Fig. 4 represents a transverse section substantially along the plane indicated by the line 4—4, Fig. 2.

Figure 1:
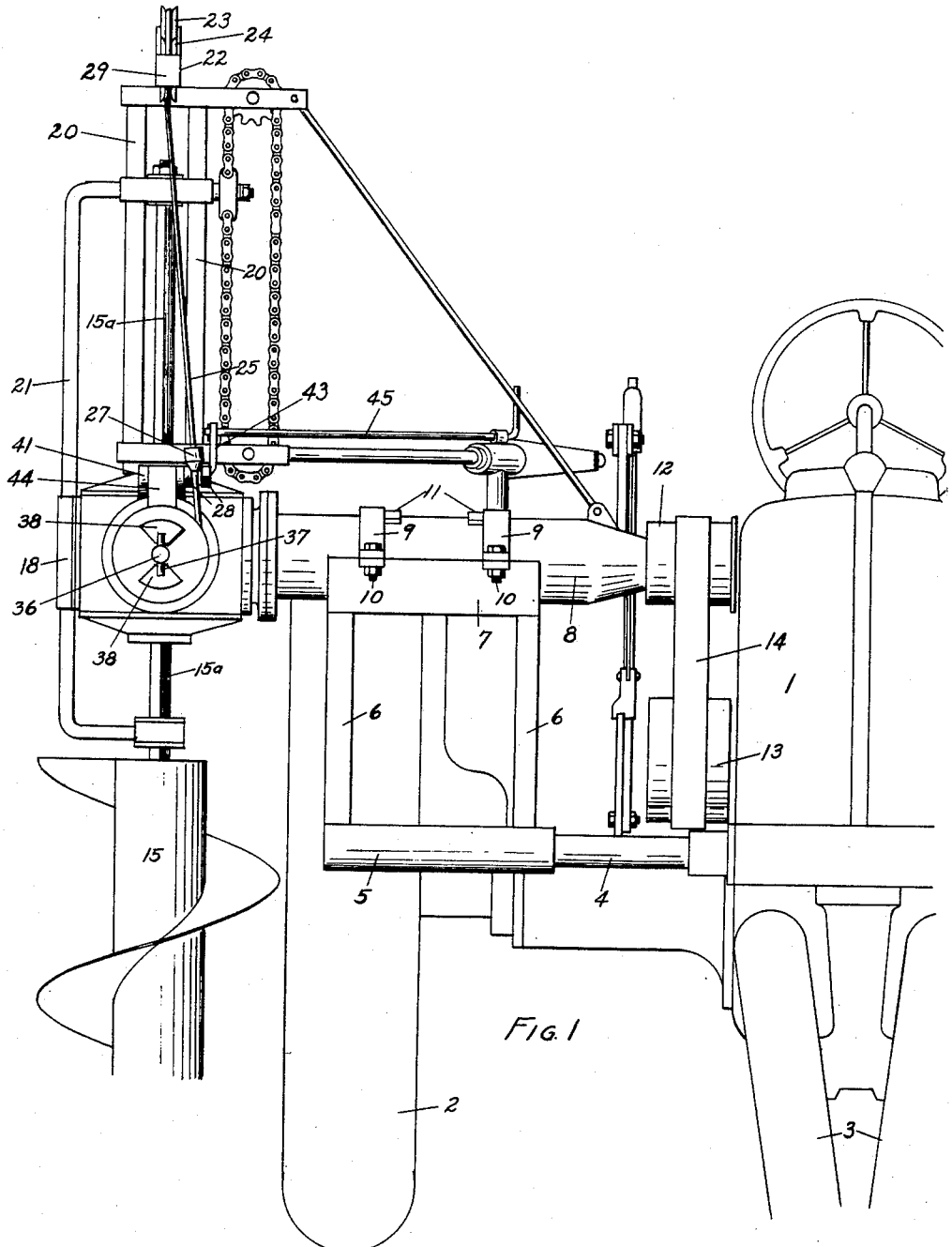
Fig. 1 shows a front view of my combined post hole digger and post driver, in conjunction with a partial front elevation of a tractor.

While I have shown a tractor 1, having rear wheels 2 and front wheels 3, it will be understood that this is for purposes of illustration only and that I do not intend that the claims be limited to the use of any particular tractor. This tractor is providerd with a transverse opening extending through the bottom part thereof, and in this opening is placed a shaft or pipe 4 upon which the post hole mechanism and post driver may be mounted and carried. A sleeve 5 is slipped on the shaft or pipe 4 and has supporting members 6 rising therefrom to a trough 7 in which is mounted a housing 8. This housing 8 is held in place in the trough 7 by means of straps 9 bolted to the trough, by bolts 10. Lugs 11 are secured to the housing 8 so that they engage the straps 9 and prevent longitudinal shifting of the housing. Inside of this housing is a shaft 17, on the inner end of which is mounted a belt pulley 12 which is connected to a pulley 13 by a belt 14. The pulley 13 is driven from the power unit of the tractor and, through the shaft 17 in the housing 8, furnishes the power to drive the ring gear 19a which drives the auger 15 and the winding drum 16. The shaft 17 is shown in Fig. 3.

The auger 15 is carried and driven by a shaft 15a passing through the ring gear 19a. A guide post or housing 20 rises from the top of the gear housing 19 and serves as a guide for the shaft 15a and the bar 21 passing through the guide sleeve 18 on the side of the gear housing 19. Most of the structure thus far described is concerned with the driving and guiding of the auger but most of it relates also to the post driver.

As is clear from Fig. 1, the guiding post 20 is made up of two parts which are substantially parallel and between which the angular shaft 15a moves up and down.

Across the top of the post 20 is fastened a crossbar 22 which may be made up from a pair of plates secured together or from a bar having slots in its two ends for the reception of the pulleys 23 and 24. Over these pulleys runs a cable 25, one end of which is secured to the driving weight 26 and the other to the drum 16. On this cable 25 is a trip member 27 so arranged that it will engage the fork 28 through which the cable passes. The two ends of the bar 22 are closed, as shown at 29 in Fig. 1, to prevent the cable from becoming detached from the pulleys 23 and 24.

A guiding tube 30, of the form shown in Figs. 2 and 4, is secured to the crossbar 22 by a bracket 31, and to the gear housing 19 by a bracket 32. A gusset 33 connects the bracket 32 to the guiding tube 30 and therefore this tube is rigidly mounted with respect to the rest of the machine. The opening 34 in the side of the tube 30 furnishes a means for inserting the post 35. If the post is not driven down far enough to clear the bottom of the tube 30, the tractor may be driven ahead until the tube 30 clears the post 35 which can slip through the opening 34.

As indicated above, the end of the cable 25 is secured to and wound on the drum 16 which is free to turn on the shaft 36 provided near its end with a cross pin 37. Lugs 38 are located on the forward end of the drum 16 and cooperate with the pin 37 in forming a driving clutch between the shaft 36 and the drum. On the second or inner end of this shaft 36 is a bevel pinion 39 which meshes with the ring gear 19a. The shaft 36 passes through a ball bearing, as shown in Fig. 2, and, therefore, driving friction is reduced to a minimum. The bearing housing 40 in which the ball bearing is located is connected to the side of the gear housing 19 and has a bracket 41 extending outwardly therefrom in which is a pivot member 42. A crank arm 43 is operatively connected to the fork 28 and the clutch shifter 44 so that when the fork 28 is turned about the axis of the pivot 42, the drum 16 will be shifted longitudinally of the shaft 36. A shifting rod 45 is connected to the upper end of the crank 43 and extends back into the vicinity of the driver's seat. When the rod 45 is pulled, it causes the clutch shifter 44 to move the flange 46 forwardly. This is connected with the drum 16 and therefore moves this against the pin 37 with the lugs 38 alternating therewith. Rotation of the shaft 36 now causes drum 16 to rotate and wind the cable 25 thereon. When the trip member 27 engages the fork 28, it causes the rod 45 to be pulled forwardly and the flange 46 to be moved backwardly, taking the lugs 38 out of engagement with the pin 37. Under the influence of the weight 26, the cable 25 is unwound from the drum 16, the weight falling through the tube 30 upon the post 35 therein. As the post is driven down, the weight 26 goes farther down in the tube 30 and the trip 27 goes farther up toward the pulley 24.

From the foregoing it will be seen that I have provided a mechanism which is easy to operate, inexpensive to produce, and semi-automatic in its operation.

It will of course be understood that the specific description of structure set forth above may be departed from without departing from the spirit of this invention as set forth herein and in the appended claims.

Having now described my invention, I claim:

1. In a structure for the purpose indicated, to be attached to a tractor, supporting means to be supported at the side of a tractor, a housing supported by said supporting means, a drive shaft enclosed in said housing, a drive pulley connected to said drive shaft to cause rotation thereof, said pulley being connected in driving relation to the power unit of the tractor, a gear housing connected to and supported by the first mentioned housing, the drive shaft extending into the gear housing, a shaft extending into said housing from the front and extending forwardly therefrom, a winding drum on the last mentioned shaft, a clutch mechanism for connecting said drum and its shaft in driving relation, a post rising from said gear housing, supporting means connected to the upper part of said post, the last mentioned supporting means extending transversely of the post and having pulleys adjacent its ends, a cable wound on said drum and extending up to one of said pulleys and across the tops of both of them and then downwardly, a driving weight suspended from said downwardly extending end of said cable, a weight-guiding tube supported by the gear housing and post assembly and containing said weight which is freely slidable therein under the influence of gravity, and means for actuating said clutch to cause driving connection between the winding drum and the first mentioned shaft.

2. In a post driver for attachment to a tractor, having an opening for reception of a supporting bar; a bar in said opening, a supporting frame mounted on said bar, a housing supported by said supporting frame, a drive shaft rotatably mounted in said housing, driving means connecting said shaft to the power unit of the tractor whereby the shaft may be rotated, a gear housing connected to and supported by the first housing, a second shaft extending forwardly from the gear housing, gearing in said gear housing connecting said shafts in driving relation, a winding drum on the front end of the second shaft, clutch mechanism connecting the drum and its shaft in driving relation and capable of releasing them from such relation, actuating mechanism for said clutch mechanism, a supporting post extending above the gear housing, a pulley supported by said post, a weight-guiding member supported adjacent said post, a weight slidable in relation to said weight-guiding member, a cable connected to said weight, passing over the pulley and down to the drum to be wound thereon to raise the weight, and means for releasing the weight so it will fall.

3. In a post driver, a gear housing, a post holding and guiding unit adjacent and connected to said housing, a supporting post rising above said housing, a cross-arm connected to the upper part of said supporting post and supporting one or more pulleys, a driving weight associated with the post guiding unit, a cable connected thereto and passing over said pulley or pulleys, a drum to which the second end of said cable is connected and about which it may be wound, a shaft extending out of and away from said gear housing, said drum being mounted on said shaft and being rotatable either with or independently of the shaft, a clutch mechanism for connecting the drum to the shaft for rotation therewith, or disconnecting it therefrom, means in connection with the cable for actuating the clutch to disconnect the drum from driving engagement with its shaft when the driving weight has been raised a desired distance, means extending from the vicinity of the driver's seat of the tractor to the clutch actuating means whereby the driver of the tractor may actuate the clutch to cause the drum to wind the cable thereon, and driving connections between said shaft and the power unit of the tractor for transmitting actuating force to the shaft.

4. An attachment for a post hole digger comprising, in combination, a supporting and guiding post, a gear casing on which said post is mounted and from which it rises a substantial distance, gearing in said casing, driving means connecting said gearing to a shaft-driving means, post-guiding means connected to and supported by said gear casing and said post, a driving weight in said post guide, a cable connected to said weight and passing over anti-friction means mounted on said post, a shaft driven by the gearing in the gear casing, a drum on said shaft, means for connecting this shaft and drum in driving relation, means for automatically disconnecting the drum and shaft when the weight has been raised to a predetermined height, and manual means for connecting said drum and its shaft in driving relation.

5. Means for mounting a post driver on a tractor, comprising a shaft projecting from a side of the tractor, a supporting frame mounted thereon and extending upwardly therefrom, a shaft casing supported by said frame, and post-driving mechanism supported by said casing.

6. A tractor-supported and operated farm implement comprising a gear casing, gearing therein, a shaft housing supporting said casing, a driving shaft therein connected with and operating said gearing, a driving connection between said shaft and the tractor power unit, supporting means for supporting said shaft housing upon the tractor, a shaft extending outwardly from said casing and having on one end thereof one of the gears in said casing, the last mentioned shaft having on its projecting end a cable-winding drum, slidable along the shaft, clutch means for connecting the drum and its shaft in releasable driving relation, a post-driving weight, and a cable for raising said weight, said cable being windable upon said drum when the clutch is engaged.

7. Actuating means for a post-driver comprising a shaft to be connected in driving relation to the power unit of a tractor, a driving connection between said shaft and said power unit for causing rotation of the shaft, a shaft-housing supported by the tractor and housing said shaft, a gear casing connected to said housing, said shaft extending into said casing and having a bevel gear thereon, a second shaft extending into said casing and having a bevel gear thereon within the casing, a third bevel gear within the casing connecting the first and second gears in driving relation, a cable-winding drum on the projecting end of the second shaft, said drum and its shaft being movable longitudinally, relatively to each other, a post-driving weight, a cable connecting the winding drum and the weight to cause raising of the weight when the cable is wound on the drum, and means for stopping the raising of the weight at a predetermined point and ensuring that it will be dropped when stopped.

OWEN D. KELLY.